US008689958B2

(12) United States Patent
Noehl et al.

(10) Patent No.: US 8,689,958 B2
(45) Date of Patent: Apr. 8, 2014

(54) DUAL-CLUTCH TRANSMISSION

(71) Applicant: Schaeffler Technologies AG & Co. KG, Herzogenaurach (DE)

(72) Inventors: Oliver Noehl, Buehlertal (DE); Johannes Arnold, Achern (DE); Dirk Hofstetter, Durmersheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/855,484

(22) Filed: Apr. 2, 2013

(65) Prior Publication Data
US 2013/0220762 A1 Aug. 29, 2013

Related U.S. Application Data

(63) Continuation of application No. PCT/DE2011/001753, filed on Sep. 21, 2011.

(30) Foreign Application Priority Data

Oct. 6, 2010 (DE) .......................... 10 2010 047 426

(51) Int. Cl.
*F16D 25/10* (2006.01)
*F16D 21/06* (2006.01)
*F16D 25/0638* (2006.01)

(52) U.S. Cl.
USPC ..................................... 192/48.611; 192/48.8

(58) Field of Classification Search
USPC ........................................ 192/48.611, 48.614
See application file for complete search history.

(56) References Cited

U.S. PATENT DOCUMENTS

| 3,243,026 | A | | 3/1966 | Snoy et al. |
| 3,424,033 | A | | 1/1969 | Croswhite |
| 4,966,270 | A | | 10/1990 | Rispeter et al. |
| 7,246,692 | B2 | * | 7/2007 | Braford ..................... 192/48.611 |
| 2004/0206599 | A1 | * | 10/2004 | Hegerath .................... 192/87.11 |
| 2005/0279606 | A1 | * | 12/2005 | Heinrich .................... 192/48.91 |
| 2006/0042909 | A1 | * | 3/2006 | De Maziere ............... 192/87.11 |
| 2009/0084652 | A1 | | 4/2009 | Kummer et al. |
| 2012/0085615 | A1 | * | 4/2012 | Noehl et al. ............. 192/48.611 |

FOREIGN PATENT DOCUMENTS

| BE | 664599 | 9/1965 |
| DE | 2116311 | 10/1972 |
| DE | 3527399 | 2/1987 |
| DE | 3838865 | 6/1989 |
| DE | 3819702 | 12/1989 |

(Continued)

*Primary Examiner* — Richard M. Lorence
(74) *Attorney, Agent, or Firm* — Simpson & Simpson, PLLC

(57) ABSTRACT

A dual-clutch transmission with individual clutches, which are axially arranged one behind the other and are hydraulically actuated, with one drive-side individual clutch, one gearbox-side individual clutch, one drive-side clutch housing and two cylinder/piston pairs, whereby the first of the individual clutches connects by switch the clutch housing with one of the first gearbox input shafts and the second of the individual clutches connects by switch the clutch housing with one of the second gearbox input shafts, whereby the clutch housing is connected drive-side with a drive shaft and gearbox-side with internally arranged input lamellae supports relating to the single clutches and torque conducted to the dual-clutch transmission via the clutch housing can be conducted to both individual clutches, whereby the clutch housing supports an actuating force from the gearbox-side single clutch and a second support area supports the actuating force from the drive side clutch is provided.

11 Claims, 7 Drawing Sheets

(56) References Cited

FOREIGN PATENT DOCUMENTS

| | | |
|---|---|---|
| DE | 9114528 | 2/1992 |
| EP | 1195537 | 4/2002 |
| EP | 1698799 | 9/2006 |
| EP | 1895182 | 3/2008 |
| GB | 2191252 | 12/1987 |
| WO | 03027525 | 4/2003 |

* cited by examiner

DUAL-CLUTCH TRANSMISSION

CROSS-REFERENCE TO RELATED APPLICATIONS

This patent is filed pursuant to 35 U.S.C. §§120 and 365(c) based on International Patent Application PCT/DE2011/001753 filed Sep. 21, 2011 and claims priority from German Patent Application No. 10 2010 047 426.6, filed Oct. 6, 2010, which applications are incorporated herein by reference to their entireties.

FIELD OF THE INVENTION

The present invention relates to a dual-clutch transmission with individual clutches, which are axially arranged one behind the other and are (or can be) hydraulically actuated, for a dual-clutch transmission system in a vehicle's drive train. It has one individual drive-side clutch, one individual gearbox-side clutch, one drive-side clutch housing and two cylinder/piston pairs, whereby the first of the individual clutches connects the clutch housing with one of the first gearbox input shafts and the second of the individual clutches connects the clutch housing with one of the second gearbox input shafts, by switch.

BACKGROUND OF THE INVENTION

Such a dual wet clutch with single clutches, which are axially arranged one behind the other and are (or can be) hydraulically actuated, is known from German Patent No. 38 19 702 (Rispeter et al.), whereby the hydraulic actuation devices are arranged axially in front of and behind the individual clutches and with the same diameter as the single clutches. The axial space required for this dual wet clutch is therefore comparatively large. In order to decrease the axial space required, the hydraulic actuation devices can be shifted radially inwards and arranged to axially overlap the individual clutches if necessary, as known from United Kingdom Patent Application No. 2 191 252, (Arrowsmith et al.), German Patent No. 9 114 528, (Zahnradfabrik Friedrichshafen AG), German Patent No. 38 38 865 (Friedmann), German Patent No. 2 116 311 (Brendecke) and German Patent No. 35 27 399 (Klaue). An even more compact design can be achieved using a common coupling web firmly connected with the clutch housing between both single clutches and both cylinder/piston pairs, as is known from U.S. Pat. No. 3,424,033 (Croswhite) or European Patent No. 1 195 537(Hegerath). However, the construction of this common element known from both of these publications causes crosstalk between the individual clutches due to the joint support of the engagement force via the coupling web.

BRIEF SUMMARY OF THE INVENTION

A dual-clutch transmission with individual clutches, which are axially arranged one behind the other and are hydraulically actuated, for a dual-clutch transmission system in a vehicle's drive train, with one drive-side individual clutch, one gearbox-side individual clutch, one drive-side clutch housing and two cylinder/piston pairs, whereby the first of the individual clutches connects by switch the clutch housing with one of the first gearbox input shafts and the second of the individual clutches connects by switch the clutch housing with one of the second gearbox input shafts, whereby the clutch housing is connected drive-side with a drive shaft and gearbox-side with internally arranged input lamellae supports relating to the single clutches and torque conducted to the dual-clutch transmission via the clutch housing can be conducted to both individual clutches, whereby the clutch housing serves as an initial support area for an actuating force from the gearbox-side single clutch and whereby a second support area, independent of the first support area, for supporting actuating force from the drive-side individual clutch is provided.

Therefore, the objective of this invention is to provide an axially arranged dual clutch which avoids and largely reduces crosstalk between the individual clutches and requires a comparatively small amount of space.

For a dual clutch with input of the type specified, this objective is fulfilled by the invention as the clutch housing is connected drive-side with a drive shaft, gearbox-side with input lamellae supports arranged inwards for the individual clutches and the input torque supplied in the dual-clutch transmission via the clutch housing can be conducted to both individual clutches, whereby the clutch housing serves as an initial support area for the actuating force of the gearbox-side single clutch, and a second support area independent of the first support area is provided to support the actuating force of the first drive-side individual clutch.

The invention provides for an axially arranged dual-clutch where the input torque produced via the external clutch housing goes to the part of the clutch to operate the internal lamellae supports. Therefore, the external housing also supports the axial actuating force of one of the part clutches separately. The axial actuating force of the second part clutch is absorbed by an additional support element. By supporting the actuating forces separately, crosstalk between the part clutches is reduced with an extremely compact axial design and correspondingly small space requirements at the same time.

Preferably, the clutch housing has a contact area relating to the main axis of the dual-clutch, which is fundamentally radially arranged and can be connected with the drive shaft; a cylindrical area relating to the main axis of the dual-clutch, which is fundamentally axially arranged; and a connection and support area relating to a main axis of the dual-clutch, which is fundamentally radially arranged.

Besides that, the clutch housing can be connected with a clutch hub, whereby the clutch hub can be connected with the input lamellae supports of both individual clutches. Preferably, the clutch housing should be connected with the clutch hub using an axial spline or another rotating connection with the same effect (such as a feather key connection), whereby the axial spline or other rotating connection with the same effect is arranged on the gearbox side.

In a preferred embodiment, both of the cylinder/piston pairs have one operating piston and one seal carrier assembly each, which form a separate actuating pressure space together with a section of the clutch hub's lateral surface. Such operating pistons are pre-loaded with a spring element, which is supported on a corresponding support element or connection and support area of the clutch housing or directly on the input lamellae support. In an alternative embodiment, the cylinder/piston pairs have one operating piston each and one joint seal carrier assembly, which form a separate actuating pressure space for the individual cylinder/piston pairs together with a section of the clutch hub's lateral surface. Such operating pistons are pre-loaded with a spring element, which is supported on a support element or connection and support area of the clutch housing. In both of these alternative embodiments, the actuating pressure chambers and the spring element can each be arranged radially within the input lamellae support of the corresponding single clutch.

In a further embodiment, there is a support element locked to the clutch hub for supporting the actuating force of the drive-side single clutch so that the actuating forces of the single clutches are supported separately, thus enabling crosstalk between the two individual clutches to be prevented.

Preferably, there are output lamellae supports, which are arranged radially outside and nested in one another, for the input lamellae support. The input lamellae supports mentioned above can hereby also be formed as a section of a joint input lamellae support.

In a preferred embodiment, the productive sections of the operating pistons are arranged on each of the lamellae packages of both individual clutches on the drive-side of the corresponding individual clutch, so that the actuating direction of both individual clutches is in the direction of the gearbox. In an alternative embodiment, the productive sections of the operating pistons are arranged on each of the lamellae packages of both individual clutches between both of the individual clutches, so that the actuating direction of the drive-side individual clutch is in the direction of the drive and the actuating direction of the gearbox-side individual clutch is in the direction of the gearbox. In a further alternative embodiment, the productive sections of the operating pistons are arranged on each of the lamellae packages of both individual clutches on the gearbox-side of the corresponding individual clutch so that the actuating direction of both individual clutches is in the direction of the gearbox, whereby there are then two separate support elements for the individual clutches here and no direct support on the clutch housing.

BRIEF DESCRIPTION OF THE DRAWINGS

The preferred embodiment of the present invention is explained in more detail below with the appropriate diagrams wherein.

DETAILED DESCRIPTION OF THE INVENTION

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
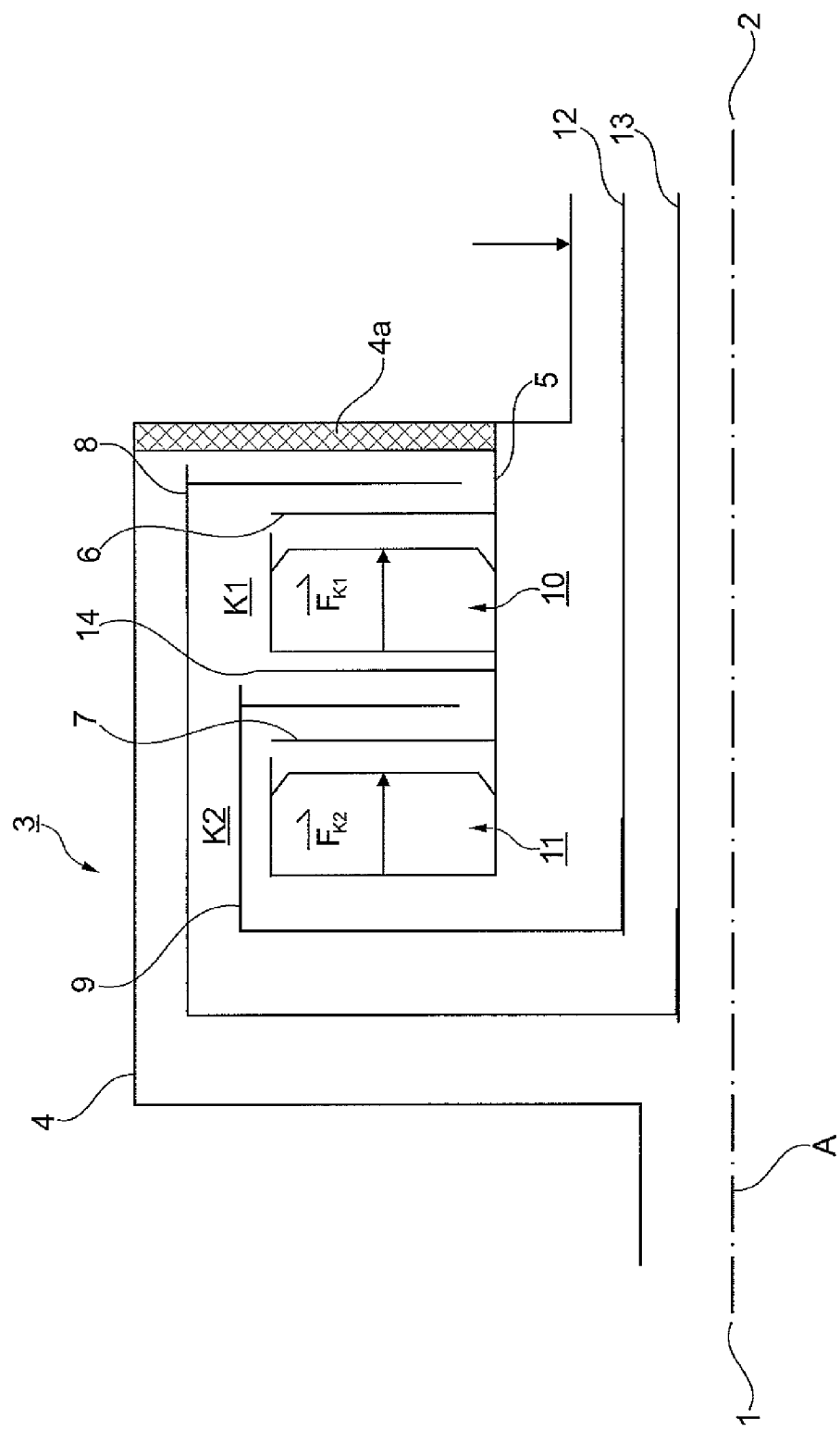
FIG. 1 is a fundamental arrangement of the dual clutch according to the invention.

Therefore, FIG. 1 schematically shows the drive train of a vehicle with a drive 1, a dual clutch transmission 2 and a dual clutch device 3 arranged between drive 1 and dual clutch transmission 2. The torque generated by drive 1 (preferably an internal combustion engine, an electric drive or a combination of an internal combustion engine and an electric drive) is thereby conducted to dual clutch arrangement 3 via clutch housing 4 and transferred to clutch hub 5. Clutch hub 5 is connected with an input lamellae support 6 of the first individual clutch K1 and an input lamellae support 7 of the second individual clutch K2. The individual clutches K1 and K2 include lamellae packages (not shown in detail in FIG. 1), which consist of at least one input side friction plate and one output side friction plate each. The output side friction plates are connected with one output lamellae support 8 for the individual clutch K1 and one output lamellae support 9 for the individual clutch K2. The input side and output side friction plates can be put into frictional contact with one another using the actuation devices 10 and 11, whereby each actuating force and the direction of the actuating force can be taken using a force vector arrow $F_{K1}$ and $F_{K2}$ for the individual clutches K1 and K2 in FIG. 1. The output lamellae supports 8 and 9 are connected with both of the gearbox input shafts 12 and 13 of the dual clutch transmission. In FIG. 1 the main axis of the dual clutch arrangement 3 is shown with the reference sign A.

Furthermore, in FIG. 1 the section 4a of the clutch housing is emphasized symbolically to show that, for the present wet dual clutches with individual, axially arranged clutches (individual clutches), the actuating force of the individual clutch K1 is supported using a part that also initiates the driving torque in the clutch system at the same time. Therefore, the clutch housing has a dual function at present.

Area 14 is also emphasized symbolically to clarify that the actuating force of individual clutch K2 is also supported by the additional part 14, which is fundamentally independent of the support 4a on clutch housing 4. This prevents individual clutches K1 and K2 from interacting (crosstalk behavior). The individual clutches can thereby be actuated in the direction of the drive or in the direction of the gearbox (even if this is not shown in the diagrams).

Figure 3:
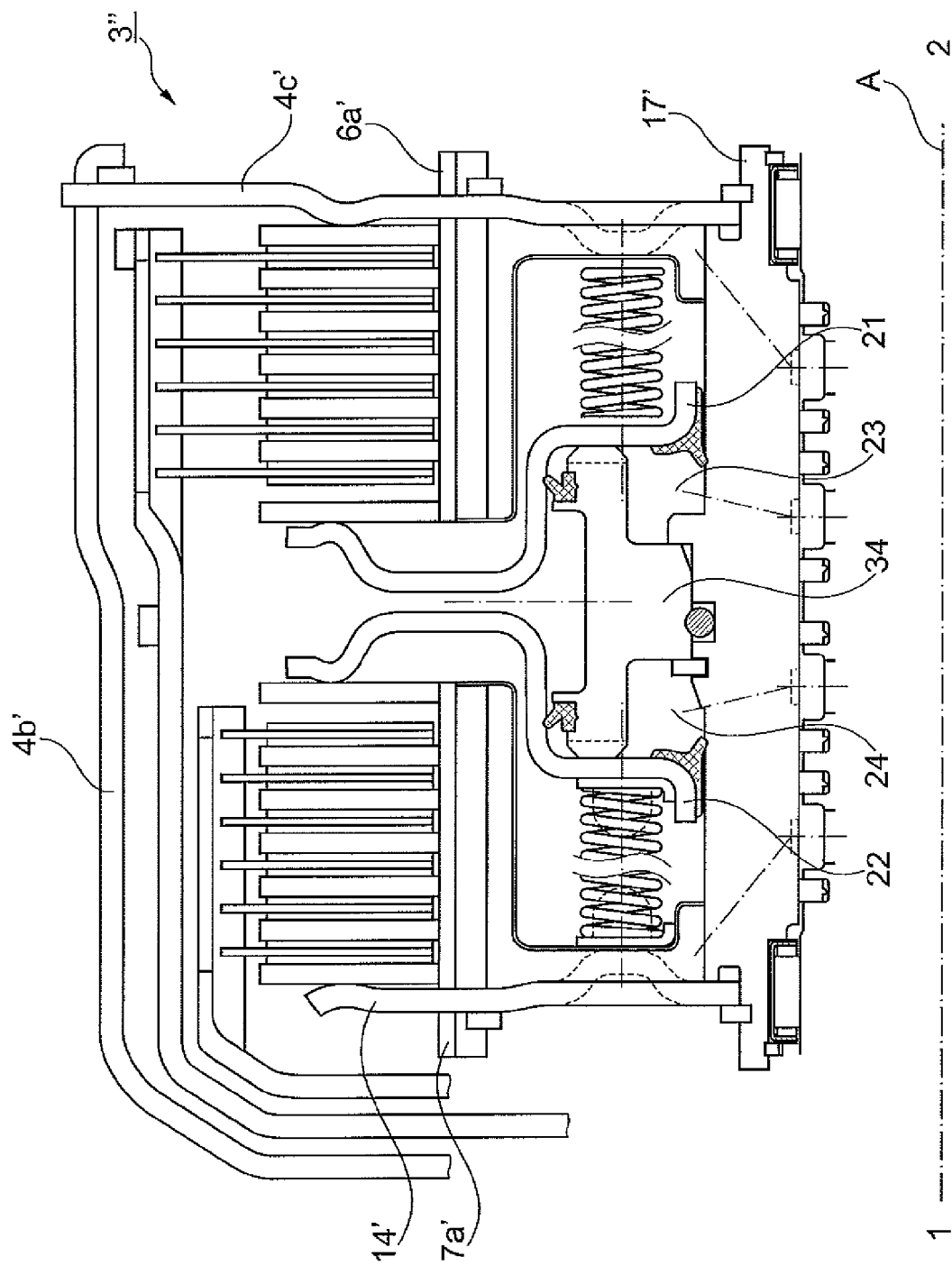
FIG. 3 is a further embodiment with the actuating direction of both individual clutches in opposite directions.

An arrangement in which the individual clutches K1 and K2 are actuated from the inside to the outside, as illustrated below in FIG. 3, is also conceivable. As a result the control elements of the individual clutches are arranged axially between the lamellae packages. With actuating forces in opposite directions it is also possible to form the actuating pressure chambers of the control elements with a joint seal carrier assembly, which the piston seal carries for both individual clutches.

Thereby it can already be taken from the schematic representation of FIG. 1 that the clutch housing 4 can be used as a clutch pot with integral support for the axial actuating force.

It can also already be taken from the schematic representation of FIG. 1 that the inside input lamellae supports are connected with the clutch hub.

Furthermore, it can already be taken from the schematic representation of FIG. 1 that the additional support element 14 can also be connected with the clutch hub.

Figure 2:
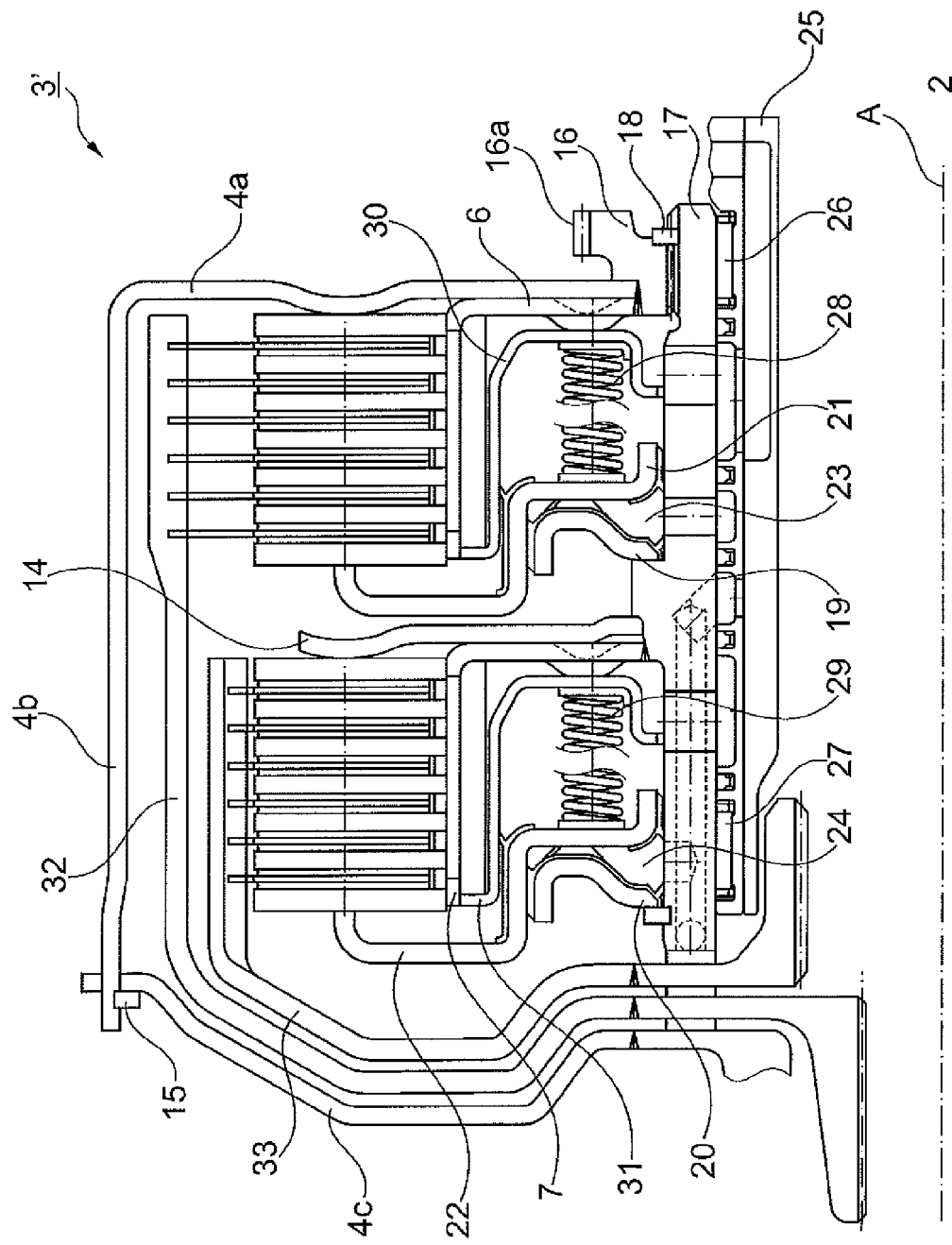
FIG. 2 is a first embodiment with the actuating direction of both individual clutches in the direction of the gearbox.

In FIG. 2 there is a detailed construction in which the actuating forces correspond with the force arrows $F_{K1}$ and $F_{K2}$ in FIG. 1. Therefore, FIG. 2 shows a half-section corresponding with the main clutch axis A. The clutch housing 4 is illustrated here in two parts made of a clutch pot with the bottom area 4a and the cylindrical wall section 4b and a towing arm bracket 4c, whereby the towing arm bracket 4c and the cylindrical wall section 4b are positively interlocked and secured axially by a circlip 15. The bottom area 4a, which also serves to support the axial actuating force of the clutch K1, is firmly connected with an output component 16 with which a hydraulic fluid pump can be operated. The part 16 also shows a gears system 16a for transferring torque to a hydraulic pump. The part 16 also includes a radial, internal gear system for connection with a clutch hub 17. The axial spline between part 16 and clutch hub 17 can also be replaced by a feather key connection or another connection which transmits torque. This axial spline or similar connection currently secured by a circlip or a similar securing device, for example a stem nut 18.

FIG. 2 also shows the input lamellae support 6 of individual clutch K1, whereby the input lamellae support 6 is currently connected with part 16 so that torque is transmitted directly via this part 16. Alternatively the input lamellae support 6 could also be arranged on the clutch hub 17.

FIG. 2 also shows the input lamellae support 7 of individual clutch K2, which is directly connected to the clutch hub 17. The additional support component 14 is arranged between the input lamellae support 7 of individual clutch K2 and a section of the clutch hub 17. It is thereby sufficient that the additional part 14 shall be supported against twisting and movement in the direction of the gearbox towards the clutch hub 17. Additional axial fixing in the direction of the drive is not currently necessary. Support component 14 and input lamellae support 7 can also be integral.

In a particularly preferred embodiment, the drive lamellae supports used as inner lamellae supports are locked to the rotor (=clutch hub 17). Each of the support sections 14 and 14a are also connected with the rotor 17; however, they do not have a positive and non-positive connection with the inner lamellae supports. The support section of K2 (intermediate strut 14) is centered radially on the rotor and supports axial forces occurring during clutch actuation on a shoulder of the rotor. As torque does not have to be transmitted here, it is not necessary to lock the intermediate strut 14 to the rotor, which is why this has not been done. The support section 4a of K1 is made from drive-pot 4. The drive-pot 4 conducts torque to rotor 17 via pump wheel 16. When actuating K1, drive-pot 4 transmits torque and axial force. For this reason drive-pot 4 is centered radially on the pump wheel 16, is supported axially by the pump wheel shoulder and is locked with pump wheel 16.

When actuating the individual clutches K1 and K2, only the support sections 4a and 14 of the individual clutches K1 and K2 are axially deformed. The drive lamellae supports 6 and 7 are thereby axially unloaded and undeformed. Therefore, there is the function of transmitting torque to the steel plates when simultaneously axially repositioning the lamellae in all operating conditions.

There would not be this function if the support section extending radially and the inner drive lamellae support were firmly attached to one another. Both torque in the direction of rotation and also torque transverse to the direction of rotation is transmitted. When actuating the clutch, the disc-shaped support section is then deformed due to the axial force conducted and its ultimate rigidity. In the event of a firm connection between support section and inner lamellae support, the inner lamellae support would then also be loaded and deformed by the axial force conducted. The resulting conical deformation in the direction of rotation would then reduce the clearance between the steel plates suspended in the inner lamellae supports and the inner lamellae supports to zero. As a result, the steel plates would stick to the inner lamellae supports and would no longer be moveable axially without force. This would lead to a loss of torque capacity, because part of the actuating force conducted axially in the form of axial displacement force of the steel plates would be "lost".

Sealing plates 19 and 20, which also act as seal carrier assemblies for both of the cylinder/piston pairs for actuating individual clutches K1 and K2, are also arranged on clutch hub 17. Pressure chambers 23 and 24 are formed between sealing plates 19 and 20 and operating pistons 21 and 22 of the individual clutches K1 and K2 and the corresponding sections of the lateral surfaces of clutch hub 17. These pressure chambers 23 and 24 are supplied with hydraulic fluid via clutch hub 17 and also an inner oil feed and support component 25. At least two radial bearings, 26 and 27, and numerous sealing elements are arranged between this internal support part 25 and the clutch hub 17.

At present the operating pistons 21 and 22 are pre-loaded in the "open clutch" direction via spring elements 28 and 29 (whereby a pre-load in the "clutch closed" direction for at least one of the clutches is conceivable, which would result in energetic advantages). Each of the current spring elements 28 and 29, in the form of coiled springs, are hereby supported on support components 30 and 31. These components 30 and 31 are axially supported in turn on input lamellae supports 6 and 7. These support brackets 30 and 31 are identical in the present embodiment (common parts).

The operating pistons (hereinafter also referred to as "pressure pots"), which conduct the engagement force of the clutches K1 and K2 to the lamellae packages, can be arranged in two parts; for example, as already known from U.S. patent application No. 2006/0086586 (Bradford), incorporated herein by reference. The radial inner part of these two-part operating pistons constitutes the actual "pistons" and has (piston) seals on the external and internal diameters. These pistons also have a collar area which provides a sealing surface. The sealing necessary for this is found as an insert in a nut placed in the rotor. The radial outer part of these two-part operating pistons conducts the engagement force to the lamellae package and can be termed a "thrust piece". Seals for hydraulic fluid equalization are arranged on the thrust pieces.

As can already be derived from FIGS. 2 and 3, it is preferable to form the pressure pots out of one part rather than as described immediately above. The functions of thrust pieces and pistons described above are thus combined in one part. The seal for hydraulic fuel equalization and the radial inner piston seal are vulcanized on the (integral) pressure pot. If, as derived from FIGS. 2 and 3, identical positions for pressure oil feeds are given for both individual clutches, the same pressure pot can be used for K1 and K2 (see FIGS. 2 and 3). The embodiment described above has the following advantages:

Due to the one-piece pressure pot, the tolerance chain over the pressure pot is reduced by at least one toleration (assembly advantage);

Identical pressure pots (common parts) for both individual clutches; only one set of tools would be necessary for mass production of the sheet metal part; only one tool would be necessary for vulcanizing the seals as well; and, The piston seals are located on the pressure pots, so it is not necessary to bore additional sealing channels in surrounding parts; assembling the pressure pots is easier; incorrect assembly is ruled out.

The pressure pots are currently designed so that, even in the case of maximum travel distances of the pressure pots of both individual clutches, the flow cross-section of the corresponding coolant feeds is not affected. If the pressure pot will partially pass the bore of the coolant feed upon actuation, the flow cross-section would be reduced and affect the flow system of the clutches.

The support parts 30 and 31 shown in FIGS. 2 and 3 for the springs 28 and 29 also have further functions: supplying coolant and hydraulic fluid. So, in the present embodiment, the design of the coolant feed is identical for both individual clutches. Therefore, the flow system is also identical. Additionally, the overflow edge of the oil pass tube is directly over the respective coolant feed and thus has the function of flow divider. Part of the coolant is fed directly into the hydraulic fluid tank, so that the hydraulic fuel tank is filled to an ideal level in all clutch operating conditions. The other part of the coolant is fed directly to the clutch between the oil pass tube and inner lamellae support.

The torque transmittable via the lamellae packages of individual clutches K1 and K2 when applying appropriate actuating force is transmitted via output lamellae supports 32 and 32 to the gearbox input shafts shown (not in detail) in FIG. 2, whereby the gearbox input shafts are currently formed as solid shafts and hollow shafts and arranged concentrically to one another.

With the arrangement shown in FIG. 2, there is an application of actuating force to the individual clutches, meaning in the direction of the gearbox in both cases, whereby the actuating force of the gearbox side individual clutch K1 is made on the clutch pot and the actuating force of the drive-side individual clutch K2 is made on a separate element, whereby the support element 14 does not constitute a component of the cylinder/piston pair of the appropriate individual clutch and, if necessary, can be designed integrally with the input lamellae support 7.

In an axial direction, the clutch shown in FIG. 2 extends over axial bearings between towing arm bracket 4c and output lamellae support 32, between output lamellae support 32 and output lamellae support 33 and also between output lamellae support 33 and the front end of the clutch hub 17, in conjunction with the securing element 18. Furthermore, the internal part 25 is either supported via a gearbox input shaft or a connection to the clutch bell.

In FIG. 3 there is another embodiment of the present dual clutch. Only differences from the present dictated embodiment only are described below. When doing so, common parts are shown with the same reference.

The dual clutch transmission in accordance with the embodiment as stated in FIG. 3 includes a clutch housing 4, but where the towing arm bracket was arranged on the gearbox-side and the clutch pot on the drive-side, resulting in a "reflection" of the clutch housing consisting of towing arm bracket and clutch pot. In this reflected organization, the support area of the actuating force of the single clutch K1, which is arranged on the gearbox-side, is no longer arranged in the bottom area 4a but rather on the towing arm bracket 4c instead.

In accordance with the embodiment as stated in FIG. 3, the input lamellae support has also been modified in that it only includes one lamellar range, 6a', which is connected with the towing arm bracket 4c' so that the towing arm bracket 4c also supports the lamellar range 6a' on the clutch hub 17'. As an alternative to this example of an integral formation of lamellar range and input lamellae support, an input lamellae support corresponding with the embodiment stated in FIG. 2 could be used, whereby the input lamellae supports and towing arm bracket would include an independent radially extending area to connect with the clutch hub 17, by means of a pump drive comparable with component 16 in FIG. 2 if necessary.

Support strip 14', which presently also forms the support area of the input lamellae support 7 of individual clutch K2 at the same time, is also arranged on clutch hub 17. In turn, only one lamellae bracket area 7a', which is connected with the support plate 14', is necessary at present. One input lamellae support corresponding with the embodiment stated in FIG. 2 separate from the support plate 14' could be provided as an alternative to this.

The actuating force is transmitted to the lamellae packages of individual clutches K1 and K2 via the operating pistons 21 and 22, whereby the operating pistons 21 and 22 with a joint seal carrier assembly 34 (which now replaces the two separate seals 21 and 22 according to FIG. 2) together with sections of the lateral surfaces of the clutch 17' form the pressure chambers 23 and 24.

The operating pistons 21 and 22 are arranged axially between the individual clutches K1 and K2 in accordance with the embodiment stated in FIG. 3 and work in opposite directions so that, in accordance with the embodiment stated in FIG. 3, the actuating force of the gearbox-side single clutch K1 works in the direction of the gearbox and the actuating force of the individual clutch K1 arranged drive-side works in the direction of the drive. The joint self-carrier assembly 34 is hereby designed as a separate part connected with the clutch hub 17', whereby a sealing element is provided to seal the pressure chambers 23 and 24 against one another. The other characteristics of this embodiment stated in FIG. 3 correspond with those shown in connection with FIG. 1 and in connection with FIG. 2.

The embodiment shown in FIG. 2 thus shows the actuation of both individual clutches in the direction of the gearbox, whereby actuation of both individual clutches in the direction of the motor is possible as an alternative to this. For actuation in the direction of the gearbox, the axial actuation force of the gearbox-side individual clutch is supported via the bottom area of the clutch pot. For actuation of both individual clutches in the direction, there is not support of this type on the clutch pot but on another support element or, if necessary, also directly on one of the output lamellae supports.

In accordance with the embodiment as stated in FIG. 3, both individual clutches are actuated in opposite directions, whereby the operating pistons are located axially between both of the single clutches. Both actuating pressure chambers can hereby be formed by one joint seal carrier assembly.

The embodiments in accordance with FIGS. 1 to 3 is shared in that the drive of the dual switch device and the support of the actuating forces or one of the individual clutches takes place via the drive-pot and the actuating force of the other single clutch takes place via a separate component, thus preventing crosstalk between the two individual clutches. Therefore, actuation can be in the direction of the gearbox and/or in the direction of the motor. Accordingly the opportunity arises to actuate the individual clutches "from inside to outside", so according to the design stated in FIG. 3, whereby the individual clutch K1 is actuated in the direction of the gearbox and the individual clutch K2 in the direction of the motor and the operating pistons are arranged axially between the two individual clutches. When actuating the individual clutches in this way, from "inside to outside", the actuation force chambers of the individual clutches can be formed by a joint seal carrier assembly, enabling further integration of the component.

Figure 4:
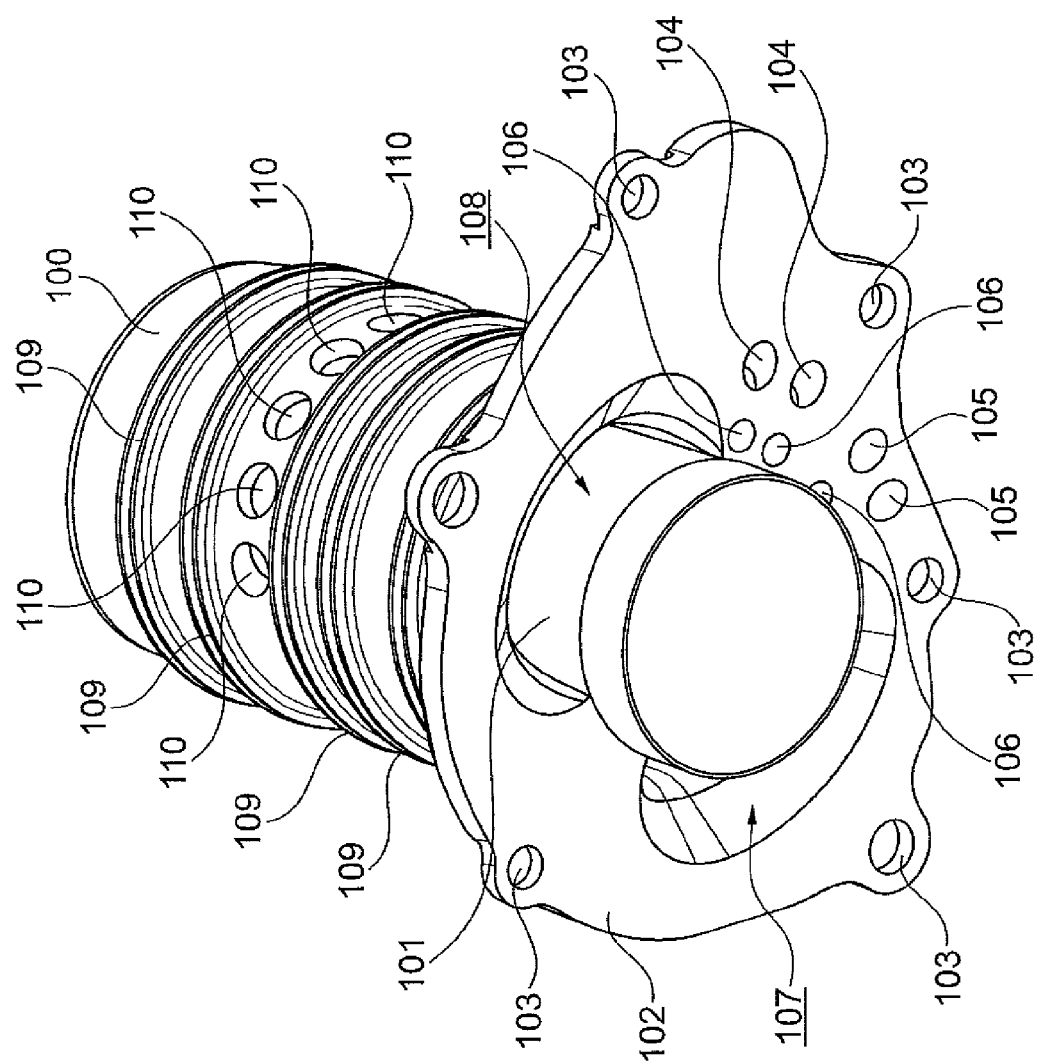
FIG. 4 is a spatial representation of the first embodiment of a constructed stator, consisting of an outer sleeve (labeled as "outer stator") and an inner sleeve (labeled as "inner sleeve")

FIG. 4 shows a spatial representation of a constructed stator, consisting of an outer sleeve 100 and an inner sleeve 101. The contact surface 102 between the outer sleeve 101 and the gearbox housing is also visible from this diagram, whereby in the outer area of the joint face several 102 screw connection areas 103 are provided to connect the stator with the gearbox housing. Furthermore, there are a number of bores 104 and 105, which are provided for supplying pressure medium to the pressure chambers of individual clutches K1 and K2. These inclined bores lead to axially extended bores in the cylindrical part of the outer sleeve 100. These bores are closed using a locking element 106. The inlet chamber 107 for the cooling medium of one of the individual clutches, K1 or K2, and the inlet chamber 108 for the cooling medium of the other individual clutch, K1 or K2, are also visible from FIG. 4. Furthermore, in the cylindrical area of the outer sleeve next to the lamellar range 109 for sealing elements, the cooling medium outlet ports 110 for one of the two individual clutches are also visible.

Figure 5:
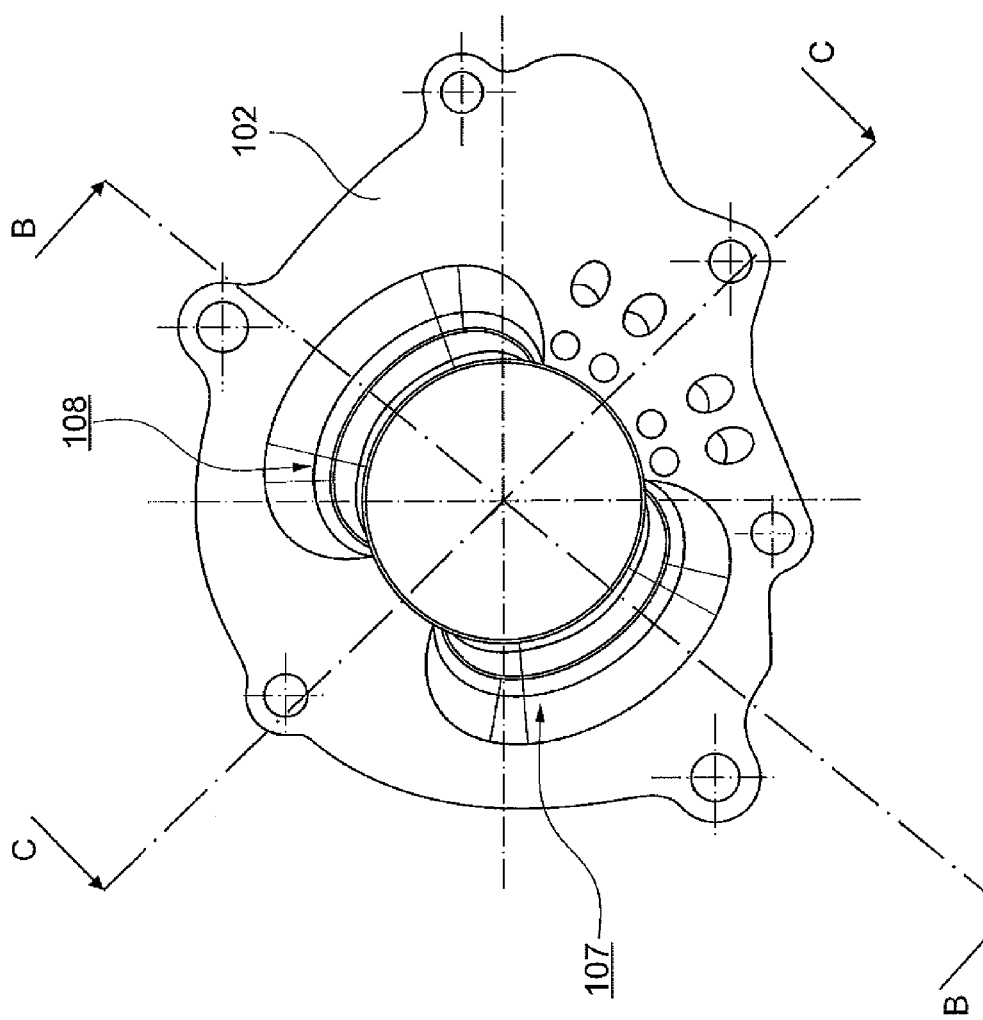
FIG. 5 is a top view of the connecting surface between stator and gearbox housing and from the viewing direction of the gearbox.
Figure 6:
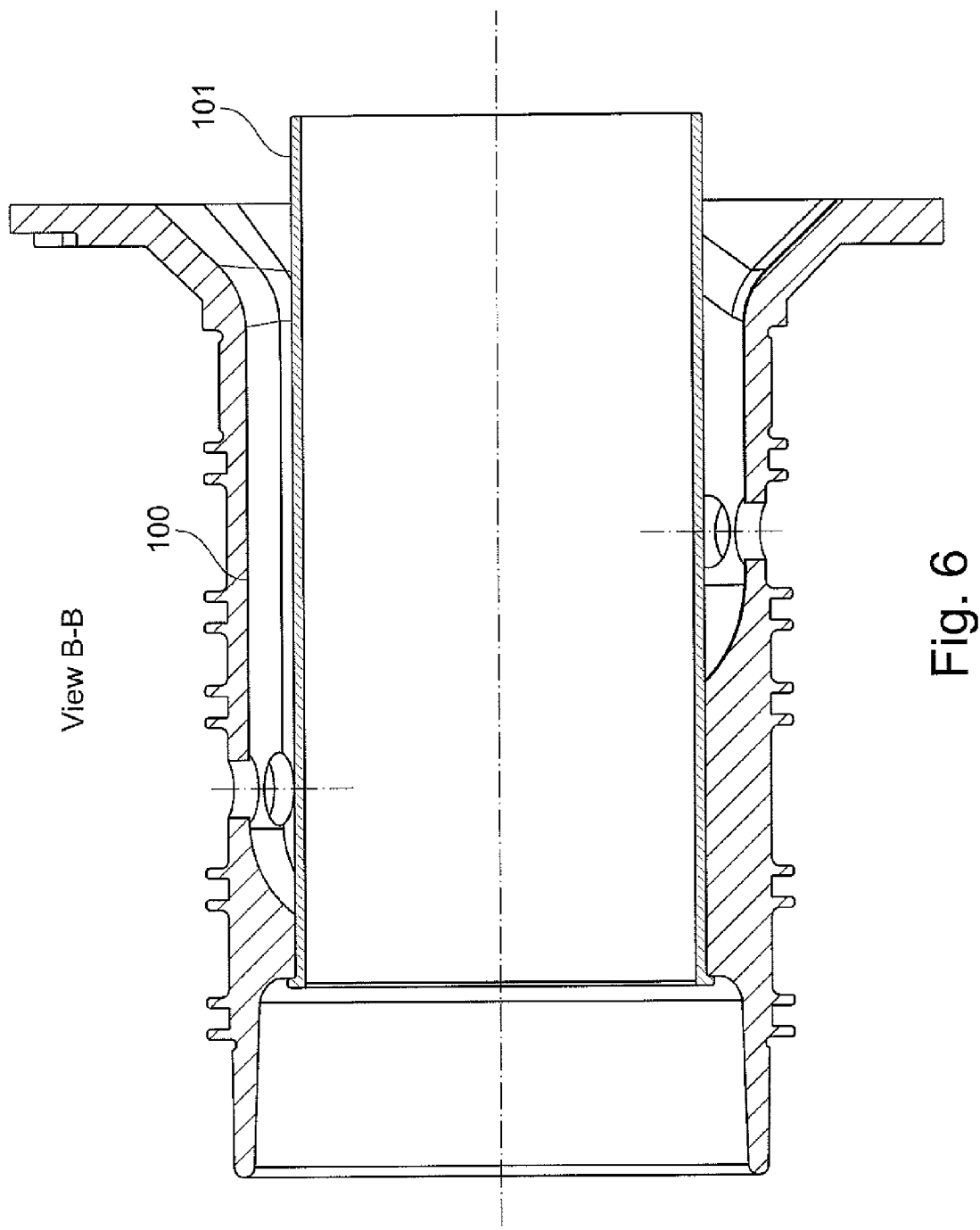
FIG. 6 is a cross-section of the sectional plane B-B in FIG. 5.
Figure 7:
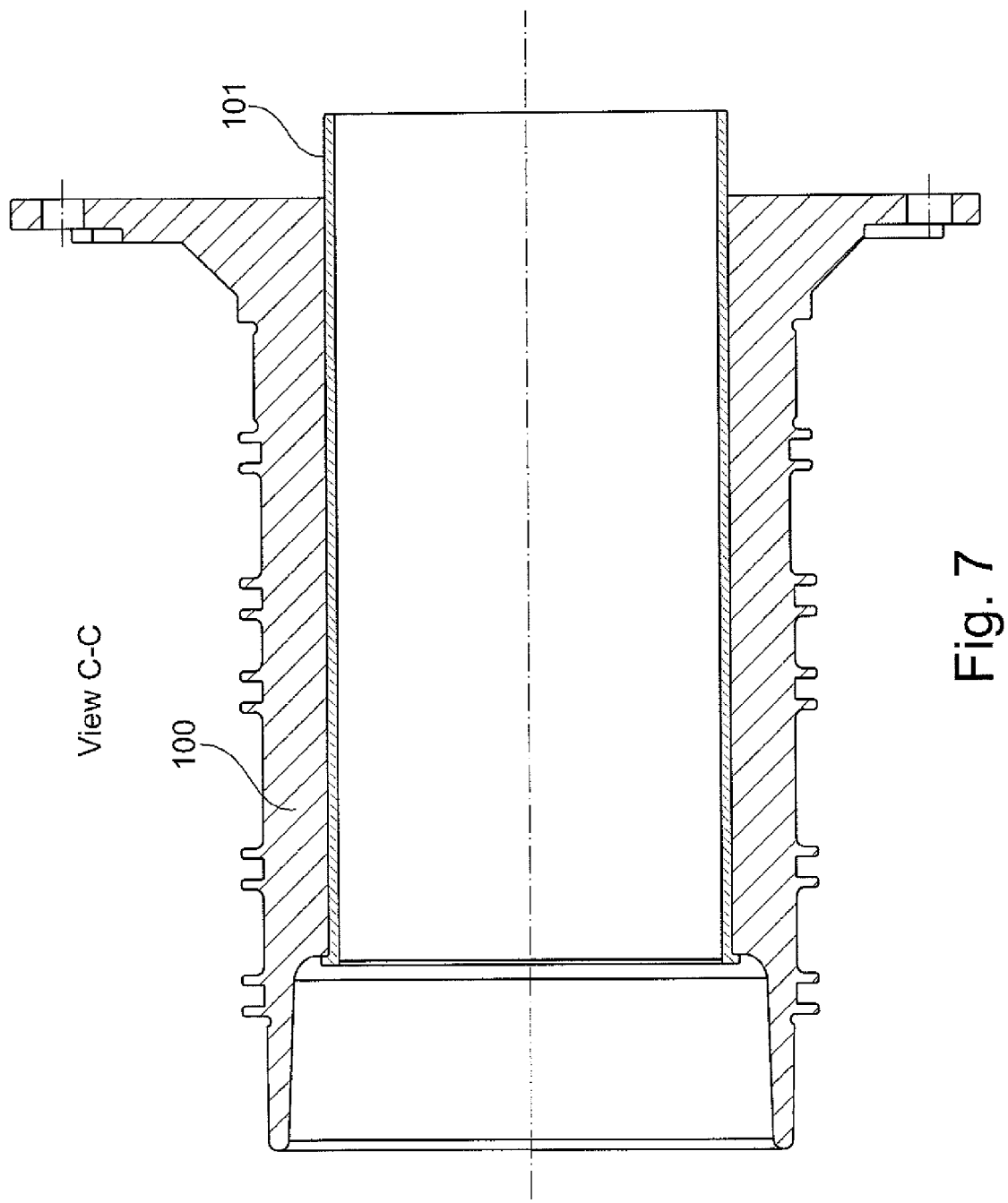
FIG. 7 is a cross-section of the sectional plane C-C in FIG. 5.

FIG. 5 shows a top-view of the joint face 103 between the stator and the gearbox housing, whereby two sectional planes B-B and C-C, which are illustrated in FIG. 6 and FIG. 7, are marked on. Thereby, FIG. 6 (cut along the sectional plane B-B) shows an area of the stator in which the coolant canal is located, whereas FIG. 7 (cut along the sectional C-C) shows areas in which the outer stator 100 is set up against the inner sleeve 101, so both of the coolant canals 107 and 108 are sealed against one another.

FIG. 6 even shows the inlet area and the coolant canal(s), which are located directly in the outer stator, whereas the inner sleeve is designed as a purely cylindrical component ("as a pipe").

The present description relates to a constructed stator as a component of a primarily axially switched, wet dual clutch transmission. In principle, operation of radially switched dual clutches is also possible. The stator has the function here of an axial bearing of the actual clutch, and potentially the centering of the clutch in the clutch housing as well as transferring oil from the clutch housing to the rotating clutch. A distinction must be made here between the K1 and K2 pressure medium (higher pressure, lower flow rate) and the K1 and K2 cooling medium (lower pressure, higher flow rate). To avoid pressure from a build-up of cooling medium, particularly high cross-sections are required here.

The channels in the stator are designed in such a way that very big cross-sections can be realized in the space available. The sealing surfaces between both of the cooling medium channels can be very narrow due to low cooling medium pressure and therefore only reduce the cooling medium cross-section slightly. In addition, soldering and/or welding and/or bonding inner sleeves and outer sleeves can increase the tightness. It is also possible to insert a separate sealing element.

The channels in the outer sleeve are machine-forged and manufactured with other forming processes. The inner sleeve is machine-produced. This results in a construction which is cost-effective to produce.

The passage for the cooling medium between housing and outer sleeve is optimized. Through channels in the outer sleeve, which are produced by forming processes, very large and streamlined chamfers can be produced cost-effectively in the local transient area of the housing and the sleeve. The drop in pressure at these transfer points is thereby drastically reduced.

In comparison to solutions with many individual bores, a variant with a constructed stator can drastically reduce the ratio of hydraulic cross-section and wall circumference. In particular, the large impact of wall friction on back pressure at lower temperatures is improved.

The pressure medium feeds are also bored, as there is enough material available locally in the external stator. This leads to a guaranteed tightness of the pressure medium feeds. The costs of this are of little significance, because only a low hydraulic cross-section is required for the pressure medium, i.e., only a few bores are required.

Besides acting as a supply/seal for oil, the inner sleeve can also serve as a centering collar for centering the clutch in the housing.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A dual clutch transmission with individual clutches, which are axially arranged one behind the other and are hydraulically actuated, for a dual-clutch transmission system in a vehicle's drive train, comprising:
   a drive-side individual clutch;
   a gearbox-side individual clutch;
   a drive-side clutch housing; and,
   at least one cylinder/piston pair;
      wherein the drive-side individual clutch connects, by a first piston, said drive-side clutch housing with a first gearbox input shaft and the gearbox-side individual clutch connects, by a second piston, said drive-side clutch housing with a second gearbox input shaft,
      wherein said drive-side clutch housing is connected drive-side with a drive shaft and gearbox-side with internally arranged input lamellae supports relating to said drive-side and gearbox-side individual clutches and torque conducted to a dual-clutch transmission via said drive-side clutch housing can be conducted to said drive-side and gearbox-side individual clutches, wherein said drive-side clutch housing serves as an initial support area for an actuating force from said gearbox-side individual clutch and wherein a second support area, independent of said first support area, for supporting actuating force from the drive-side individual clutch is provided.

2. The dual-clutch transmission recited in claim 1, wherein said clutch housing includes a part radially arranged in relation to a main axis of said dual-clutch and connectable with the drive shaft; a cylindrical area relating to the main axis of the dual-clutch, which is fundamentally axially arranged; and a connection and support area relating to a main axis of the dual-clutch, which is fundamentally radially arranged.

3. The dual-clutch transmission recited in claim 1, wherein said clutch housing is connected with a clutch hub and said clutch huh is connected with said input lamellae supports of said individual clutches.

4. The dual-clutch transmission recited in claim 3, wherein said clutch housing is connected with said clutch hub using an axial spline, whereby said axial spline is arranged on a gearbox side.

5. The dual-clutch transmission recited in claim 1, wherein the cylinder/piston pairs have one operating piston and one seal carrier assembly each, which form a separate actuating pressure space together with a section of a clutch hub's lateral surface, whereby the operating pistons are pre-loaded with a spring element, which is supported on a corresponding support element or connection and support area of the clutch housing.

6. The dual-clutch transmission recited in claim 5, wherein the actuating pressure chambers and the spring element are each arranged radially within the input lamellae support of the corresponding individual clutch.

7. The dual-clutch transmission recited in claim 1, wherein the cylinder/piston pairs have one operating piston each and one joint seal carrier assembly, which form a separate actuating pressure space for the individual cylinder/piston pairs together with a section of a clutch hub's lateral surface, whereby the operating pistons are pre-loaded with a spring element, which is supported on a support element or connection and support area of the clutch housing.

8. The dual-clutch transmission recited in claim 1, further comprising a support element proximate the second support area locked to the clutch hub for supporting the actuating force of the drive-side single clutch so that the actuating forces of the individual clutches are supported separately, thus enabling crosstalk between the two individual clutches to be prevented.

9. The dual-clutch transmission recited in claim 1, further comprising output lamellae supports, which are arranged radially outside and nested in one another, relating to the input lamellae supports.

10. The dual-clutch transmission recited in claim 1, wherein productive sections of the operating pistons are arranged on each of the lamellae packages of both individual clutches on the drive-side of the corresponding individual clutch, so that the actuating direction of both individual clutches is in the direction of the gearbox.

11. The dual-clutch transmission recited in claim 1, wherein productive sections of the operating pistons are arranged on each of the lamellae packages of both individual clutches between both of the individual clutches, so that the actuating direction of the drive-side individual clutch is in the direction of the drive and the actuating direction of the gearbox-side individual clutch is in the direction of the gearbox.

* * * * *